Oct. 24, 1933.  F. PORTER  1,931,678
PROCESS FOR THE SYNTHETIC PRODUCTION OF COMPOUNDS
Filed Dec. 2, 1931
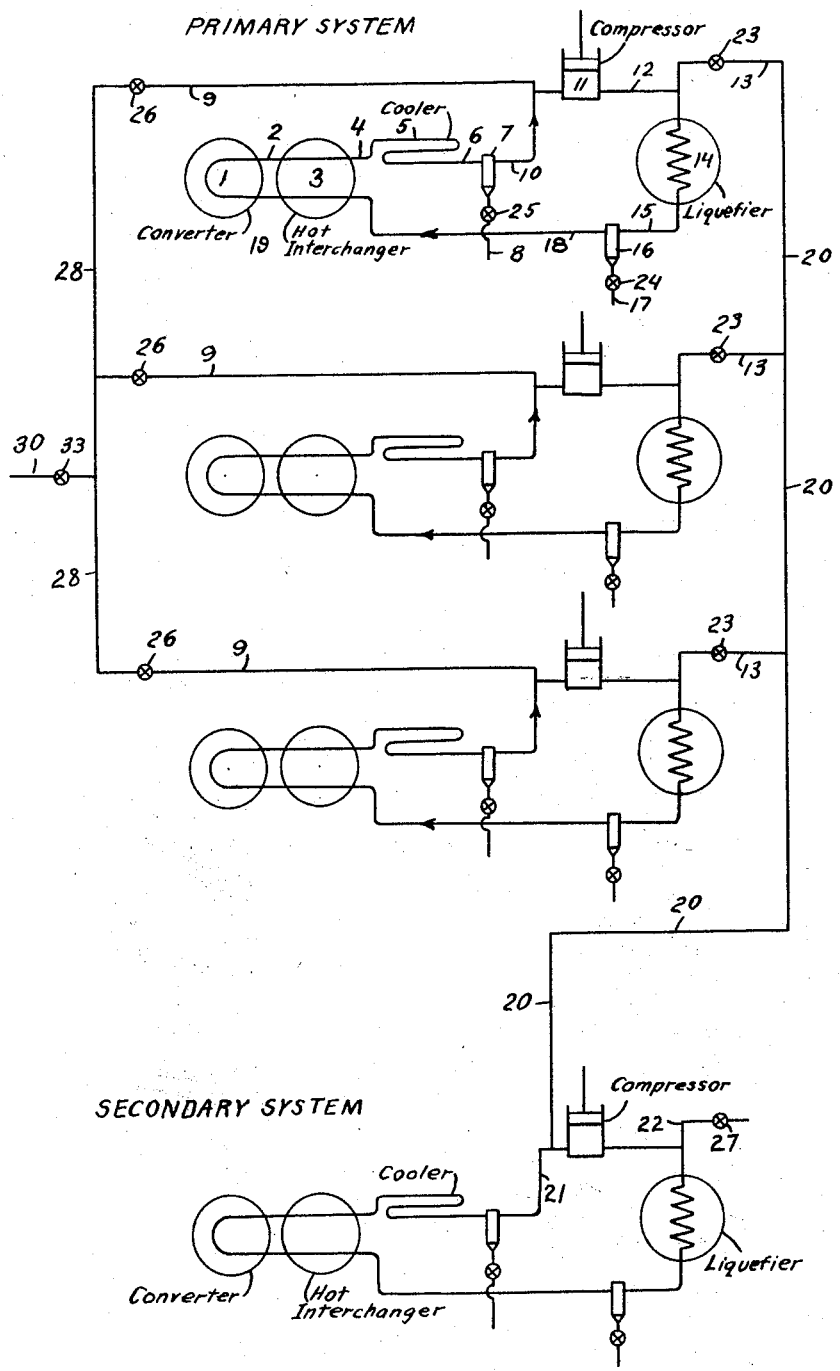
INVENTOR
Frank Porter
BY
ATTORNEY Patented Oct. 24, 1933

1,931,678

UNITED STATES PATENT OFFICE 1,931,678

PROCESS FOR THE SYNTHETIC PRODUCTION OF COMPOUNDS

Frank Porter, Syracuse, N. Y., assignor to Atmospheric Nitrogen Corporation, New York, N. Y., a corporation of New York Application December 2, 1931. Serial No. 578,485

18 Claims. (Cl. 23—199)

This invention relates to the synthetic production of compounds, and particularly to processes in which the reaction is carried out in a cyclic system. It relates further to reacting gaseous substances containing inert materials, and especially to the production of ammonia by reacting a hydrogen-nitrogen mixture having inert components in the presence of a catalyst and in a plurality of cyclic systems.

It is an object of this invention to provide a process for the synthetic production of compounds in accordance with which the efficiency and yield are enhanced, which may be readily utilized commercially and which effects a more economical operation.

Another object of this invention is to provide a process, including the reacting of substances containing inert material, in which the inert content of a primary synthesis system is maintained at a low value by withdrawing a portion of the reaction mixture and introducing the withdrawn mixture into a secondary synthesis system.

A specific object of this invention is to provide a process for the production of ammonia from a hydrogen-nitrogen mixture containing inert material, whereby the production of ammonia is rendered more economical and loss of the reacting gases due to withdrawal, or bleeding, is materially decreased.

Other objects of this invention will in part be obvious and will in part appear hereinafter.

The production of compounds synthetically involves the reacting of less complex materials in a manner such that a desired or more complex product is obtained either by complete combination of the reactants or by a combination effected with the formation of by-products. In those reactions wherein the synthesis is accomplished by a single bringing together of the reacting bodies in a pure condition, the efficiency and reactivity are usually of such a magnitude that further treatment is not required. However, when the reactivity is low and the attendant conditions are such that a repeated contacting of the reactants is necessary, the formation of by-products and their removal and the presence of impurities in the reactants become of increasing importance. This is particularly the case when the reactants are gaseous bodies.

Synthetic operations utilizing gaseous bodies may be carried out at a temperature that may vary from ordinary room temperature, about 20° C., to several hundred degrees, and at a pressure which may range from atmospheric to 1000 atmospheres and higher. Further, these processes are frequently carried out in the presence of a suitable catalyst. The extent of the action taking place between the reactants during a single passage through a reaction zone is often so small as to make such operation impracticable from a commercial standpoint, and hence the reactants are repeatedly passed through the reaction zone in a cyclic process with removal of products between successive passages and with introduction of reactants to compensate for the amount removed as product. This method of procedure involves a cyclic system in which, during a single passage through the reaction zone, only a portion of the reactants enter into combination to form the desired product and the residual uncombined materials are recirculated or repassed over the catalyst after removal of the product, in order to avoid waste. The procedure accordingly includes a cyclic system from which reactants are removed in the form of the desired product and into which an amount of fresh reactants is introduced so that a relatively constant quantity of reacting materials exists in the system.

When operating such a cyclic system, account must be taken of the presence of impurities or inert materials accompanying the reactants. These inert materials, although they may be present in only small amounts in the reacting materials, will tend continuously to accumulate in the cyclic system and the amount thereof may interfere with the synthetic operation unless provision is made for their removal. The usual procedure entails the withdrawl, or bleeding, of a portion of the reaction mixture from the cyclic system at intervals, or continuously. Inasmuch as the withdrawn mixture is higher in inert content than the fresh reactants introduced into the system, the procedure of bleeding will prevent the accumulation of the inerts in the reacting mixture. The amount of withdrawn or bleeder mixture will depend on the inert content of the reactants and the amount of inerts practically permissible in the system.

It will be evident that the reaction mixture removed from the synthesis system represents an economic loss in that it contains considerable amounts of the reacting materials which usually have been subjected to certain preparatory steps, and previously the mixture so withdrawn has been a complete loss with respect to the desired product. Further, the inert content of the materials entering into a synthetic reaction have prevented the use of certain sources of materials because of their high inert content.

I have found that the inert content of a cyclic system may be maintained and controlled by operating such system in conjunction with another similar system, one system being supplied with the fresh reaction gases and the second system being supplied with reaction gases withdrawn from the first system. A bleeding of reaction gases from the second system accomplishes a withdrawing or bleeding of material from both such systems in series. When operating several cyclic systems, it has heretofore been customary to introduce the reacting materials and to withdraw the reaction mixture for the control of the inert content in parallel, i. e., a separate introduction and a separate withdrawal was made with respect to each system. I have found, however, that it is particularly advantageous to withdraw the reaction mixture from one system and introduce it into a second system as the makeup of that system and the final withdrawal without further utilization effected only from the second system.

Thus I have found that the synthetic production of compounds may be effectively accomplished from a reaction mixture containing inert material by reacting the mixture in a primary cyclic system, withdrawing a portion of the reaction mixture, and introducing the withdrawn mixture into a secondary cyclic system. The pressure of the secondary system may be substantially not greater than that in the primary system and is preferably at or near the pressure in the primary system. The invention further encompasses the use of a plurality of primary cyclic systems into each of which reacting materials may be introduced in parallel and from each of which reaction mixture is withdrawn and introduced into a secondary cyclic system. According to this invention, the inert materials are largely concentrated in the secondary cyclic system by operating this system in series, with respect to the withdrawal or bleeding of reaction mixture, with the primary cyclic system or systems, and the inert content of the reaction mixture in the primary systems may thus be maintained at a low value. It is preferred, in accordance with the present invention, to withdraw reaction mixture from the primary system at a rate such that the gas bled from the system amounts to not less than about 10% of the fresh gas introduced thereto.

It will be realized that this process in which the reaction mixture containing inert material is withdrawn from one or more primary cyclic systems and introduced into a secondary cyclic system in which the inert concentration is higher than in the primary systems, and whereby the inert content of the primary system may be maintained at relatively low concentrations, may be utilized for the synthetic production of various compounds and especially those involving the use of gaseous mixtures such as the production of ammonia from a mixture of hydrogen and nitrogen and of methanol from carbon monoxide and hydrogen. The process will be exemplified by referring particularly to its application for the production of ammonia from a mixture of hydrogen and nitrogen containing inert material in a cyclic operation including a plurality of synthetic systems.

This invention accordingly comprises the several steps and the relation of one or more of such steps with respect to each of the others thereof, which will be exemplified in the process hereinafter disclosed, and the scope of the invention will be indicated in the claims.

For a fuller understanding of the nature and objects of this invention, reference should be had to the following detailed description taken in connection with the accompanying drawing, in which is illustrated the procedure employed for carrying out the process of this invention when utilizing a secondary cyclic system in conjunction with a plurality of primary cyclic systems.

In the practice of this invention, for example, a mixture of hydrogen and nitrogen in about the proportion of 3:1 and having an inert content which may be argon, methane and similar materials, is circulated over a catalyst at a suitable temperature and pressure in a plurality of cyclic systems, with separation of ammonia between the passes. The accumulation of inert material is overcome by withdrawing a portion of the reaction mixture and the decrease in the amount of gas in the system, due to conversion to ammonia and its removal from the system as product and due to the removal of a portion of the recirculating gas, may be compensated for by the introduction of fresh hydrogen and nitrogen mixture at a desired point. In order to maintain the inert content at a low value in a part of the synthesis system employing two or more cyclic systems, a part of the reaction mixture is conducted from one or more of the systems designated as primary systems to another system designated as a secondary system in which the inerts concentrate and are at a higher value than in the primary system. The inerts accumulated in the secondary system are discharged by removing, or bleeding, a sufficient quantity of the mixture which may be burned or utilized in some other manner. Each cyclic system will include a means for circulating the hydrogen-nitrogen mixture, a catalyst chamber or converter containing a suitable catalyst, and means for removing the ammonia produced as for example by liquefaction and/or by absorption. The synthesis system will include a primary cyclic system or systems and a secondary system. Preferably, the operation of the primary and secondary systems is at substantially the same pressure.

Referring to the drawing, it illustrates a plurality of cyclic systems which may be utilized for the production of ammonia. Specifically the procedure, in accordance with this modification, involves the use of primary cyclic systems which are operated in parallel with respect to makeup gas and bleeding, and a secondary cyclic system into which the material withdrawn from the primary systems by bleeding is introduced, the operation of the secondary system being in series relative to bleeding with the primary systems. Inasmuch as the several primary systems and the secondary system are similarly constructed, it will be necessary only to describe one of the primary systems in detail, and to state that the various parts of the other systems, if described, would be similarly indicated.

A mixture of hydrogen and nitrogen in the proportions of 3:1 by volume are reacted in a converter or catalyst chamber 1 and the reaction mixture passed through a pipe 2 to a heat exchanger 3 in which it passes in heat exchange relation with the incoming gases, thus heating these gases prior to their introduction into the converter. From the heat exchanger, the gaseous mixture is conducted by a pipe 4 to a cooler 5 and thence by a pipe 6 to an ammonia separator 7 in which a portion of the ammonia separates as a liquid and may be withdrawn therefrom by a pipe 8 provided with a valve 25. To the uncondensed reaction mixture there may be then added a supply of fresh makeup gas by means of a pipe 9 with valve 26, connected to a main 28, which is connected to a supply main 30 having a valve 33, in order to compensate for the hydrogen and nitrogen removed as ammonia and by bleeding. The reaction mixture to which fresh gases have been added, is led by a pipe 10 to a compressing means 11 and then to a liquefier 14 by a pipe 12. The cooled and partially liquefied gaseous mixture is conducted from the liquefier to a separator 16 by means of a connection 15. Ammonia in liquid form separates in the separator 16 and may be withdrawn therefrom by a pipe 17 having a valve 24. The material remaining in gaseous form is then conducted by a pipe 18 to the heat exchanger wherein its temperature is raised, and thence by a pipe 19 to the converter 1, thus completing the cyclic process.

The operation of all of the primary systems is like unto that hereinbefore described. From each of the primary systems a portion of the reaction mixture is withdrawn by means of a pipe 13 provided with a valve 23, and the thus withdrawn portions are conducted through a conduit 20 to the compressor intake pipe 21 of the secondary system. At this point, the withdrawn mixture mingles with the gaseous material being circulated in the secondary system and passes therethrough as a component part of such mixture. In order to prevent too great an accumulation of inert material in the secondary system, there is provided an outlet pipe 22 having a valve 27 which may be so regulated as to remove an amount of gaseous mixture, whereby the inert content may be held at the desired value.

A purified hydrogen-nitrogen mixture, according to this procedure, may be passed into the three primary cyclic systems in parallel at a pressure which may be about 200 atmospheres. From the primary systems and at appropriate points which, by way of example, are indicated by the pipes 13, the reaction mixture is withdrawn and passed to a single secondary cyclic system. The rates of introduction of fresh gas to, and withdrawal of a part of the recirculating gas from, the three primary systems, are in excess of normal for these systems. Preferably the amount of gas bled from each of the systems is not less than about 10% of the fresh gas introduced thereto. The inert content of the gas in the primary systems may thus be maintained at a desired low value by withdrawal of gas from each primary system to the secondary system, and the inerts in the secondary system regulated at a higher value by bleeding gas therefrom. It will be realized that although several synthesis systems are operating, such operation of the primary systems is under conditions of low inert content, which is more suitable for ammonia production, and that the increased withdrawal of the reaction mixture, made necessary by such operation, is accomplished and further utilized by introducing the withdrawn mixture into a secondary system in which an additional amount of ammonia is produced.

The synthesis process of this invention may be operated employing a catalyst of high activity in the secondary system wherein the inert content of the gases is relatively high, and a catalyst of lower activity, as for example, a catalyst which has decreased in activity through use, in the primary system wherein the gases contain a lower proportion of inerts. By thus operating the two systems, with the catalysts of differing catalytic activity, the low inert content of the primary system favors the synthesis reaction in the presence of the catalyst of lower activity, while in the secondary system the higher inert content serves to facilitate a control of the temperature of the catalyst of higher activity and thus prolong the period of its high activity.

It will be understood, of course, that the process is not limited to the introduction of the reacting gases or to the withdrawal of reaction mixture at the points hereinbefore mentioned, but that such introduction and withdrawal may be accomplished at other points without materially affecting the efficiency of the operation. For example, the gas might be withdrawn from a point in the pipe 18 and introduced into the secondary system at a point intermediate the bleeder pipe 22 and the liquefier. Furthermore, if it is desired, the residual gas withdrawn from the secondary system may be treated to remove the hydrogen content thereof and then subjected to a process for the extraction therefrom of the rare gases, as argon and helium.

In the foregoing process, the inert content of the gases undergoing reaction becomes relatively high only in the secondary system so that only a portion of the total catalyst in a plurality of systems is subjected to the influences of a high concentration of inerts in the gas. The process is, therefore, economical because the primary system may be operated at a high optimum loading and the secondary system permits of a low rate of bleeding under optimum operating conditions as compared with operating the units independently of each other. Further, by the use of the improved method of operating synthesis systems in series with respect to bleeding, there is obtained either of the following advantages or combinations thereof; namely, an increased total production and a decreased loss of gas or an increased rate of production for a given set of synthesis systems as compared with processes wherein the inert content is concentrated with respect to the entire catalyst volume.

Since certain changes may be made in carrying out the above process without departing from the scope of the invention, it is intended that all matter contained in the above description shall be interpreted as illustrative and not in a limiting sense.

I claim:

1. A process for the synthetic production of compounds which comprises reacting a mixture containing inert material in a primary cyclic system, withdrawing a portion of the reaction mixture circulating in the primary system and introducing said withdrawn mixture into a secondary system at a pressure substantially not greater than that in the primary system.

2. In a process for the synthetic production of compounds by reacting a mixture containing inert material, the improvement which comprises removing inerts contained in a reaction mixture in a primary system by withdrawing a portion of the reaction mixture which has undergone reaction in said system and introducing it into a secondary system at a pressure substantially not greater than that in the primary system.

3. In a process for the synthetic production of compounds by passing a reaction mixture containing inert material over a catalyst at an elevated temperature and pressure, the improvement which comprises removing inerts contained in the reaction mixture in a primary cyclic system by withdrawing a portion of the reaction mixture circulating in said system and introducing it into a secondary cyclic system at a pressure substantially not greater than that in the primary system.

4. In a process for the synthetic production of compounds wherein a reaction mixture containing inerts is recirculated in a system comprising a catalyst, fresh reactants are introduced into said system and the inerts are removed by bleeding therefrom a portion of said reaction mixture, that improvement which comprises introducing fresh reactants to and withdrawing reaction mixture circulating therein from said synthesis system at a rate in excess of normal and introducing the reaction mixture bled from said system into a second system for the synthetic production of compounds wherein it is subjected to catalysis.

5. A process for the synthetic production of ammonia which comprises reacting a mixture of hydrogen and nitrogen containing inert material in the presence of a catalyst at an elevated temperature and pressure in a primary cyclic system, withdrawing a portion of the reaction mixture circulating in the primary system, and introducing said withdrawn reaction mixture into a secondary system at a pressure substantially not greater than that in the primary system.

6. A process for the synthetic production of ammonia which comprises reacting a mixture of hydrogen and nitrogen containing inert material in the presence of a catalyst at an elevated temperature and pressure in a plurality of primary cyclic systems, withdrawing a portion of the reaction mixture circulating in each of the primary systems, and introducing said withdrawn reaction mixture into a secondary cyclic system at a pressure substantially not greater than that in the primary systems.

7. A process for the synthetic production of ammonia which comprises passing a reaction mixture of hydrogen and nitrogen in the proportions of 3:1 and containing inert material to a plurality of primary cyclic systems in parallel, reacting the reaction mixture in said systems in the presence of catalyst at an elevated temperature and pressure, withdrawing a portion of the reaction mixture circulating in the primary systems from said systems, introducing said withdrawn reaction mixture into a secondary cyclic system at a pressure substantially not greater than that in the primary systems, and reacting it therein in the presence of a catalyst at an elevated temperature and pressure.

8. A process for the synthetic producion of ammonia which comprises passing a reaction mixture of hydrogen and nitrogen in the proportions of 3:1 and containing inert material to a plurality of primary cyclic systems in parallel, reacting the reaction mixture in said systems in the presence of a catalyst adapted to promote the synthesis of ammonia at an elevated temperature and pressure, withdrawing a portion of the reaction mixture circulating in the primary systems from said systems, introducing said withdrawn reaction mixture into a secondary cyclic system at a pressure substantially the same as that in the primary system, reacting the mixture therein in the presence of a catalyst adapted to promote the synthesis of ammonia, recovering the ammonia thus formed separately from the treatment of the first mentioned reaction mixture in the primary cyclic system, and withdrawing unreacted material from said secondary system.

9. In a process for the synthetic production of ammonia by passing a mixture of hydrogen and nitrogen containing inert material over a catalyst at an elevated temperature and pressure, the improvement which comprises removing inerts contained in the reaction mixture in a primary cyclic system by withdrawing a portion of the reaction mixture circulating in the primary system and introducing it into a secondary cyclic system at a pressure substantially not greater than that in the primary system.

10. In a process for the synthetic production of ammonia by passing a mixture of hydrogen and nitrogen containing inert material over a catalyst at an elevated temperature and pressure, the improvement which comprises maintaining the inert content of the reaction mixture at a predetermined amount in a primary cyclic system by withdrawing a portion of the reaction mixture circulating in the primary system, introducing the withdrawn reaction mixture into a secondary cyclic system and in said system treating said reaction mixture at substantially the same pressure as that in the primary system for the synthesis of ammonia and recovery of the synthesized ammonia separately from the reaction mixture being treated in the primary cyclic system.

11. A process for the synthetic production of ammonia which comprises introducing a mixture of hydrogen and nitrogen containing inert material into a primary cyclic system and in said system recirculating the gas in contact with a catalyst at an elevated temperature and pressure, withdrawing from said primary system gas recirculating therein in amount not less than about 10% of the gas introduced thereinto and introducing said withdrawn reaction mixture into a secondary cyclic system at substantially the same pressure as that in the primary system.

12. A process for the synthetic production of ammonia which comprises introducing nitrogen-hydrogen gas containing inerts into a primary cyclic gas system where it is recirculated under elevated pressure into contact with a catalyst for the synthesis of ammonia from the gas, bleeding from said system gas recirculating therein in amount not less than about 10% of the gas introduced thereinto and passing the bled gas into a secondary ammonia synthesis system wherein it is subjected to catalysis for the synthesis of ammonia therefrom.

13. In the process for the synthetic production of ammonia wherein a nitrogen-hydrogen gas mixture is recirculated in a system comprising a catalyst, fresh nitrogen-hydrogen gas containing inerts is introduced into said system and the inerts are removed from the system by bleeding therefrom a portion of the recirculating gas carrying with it an amount of inerts equivalent to that introduced with the fresh gas, that improvement which comprises operating said synthesis system at a rate in excess of normal with respect to the rate of introduction of fresh gas and the bleeding of recirculating gas such that the amount of bleeder gas is not less than about 10% of the amount of fresh gas.

14. In the process for the synthetic production of ammonia wherein a nitrogen-hydrogen gas mixture is recirculated in a system comprising a catalyst, fresh nitrogen-hydrogen gas containing inerts is introduced into said system and the inerts are removed from the system by bleeding therefrom a portion of the recirculating gas carrying with it an amount of inerts equivalent to that introduced with the fresh gas, that improvement which comprises operating said synthesis system at a rate in excess of normal with respect to the rate of introduction of fresh gas and the bleeding of recirculating gas such that the amount of bleeder gas is not less than about 10% of the amount of fresh gas, and introducing the gas bled from said system into a second cyclic gas system wherein it is subjected to catalysis for the synthesis of ammonia therefrom and during the aforesaid steps maintaining a materially higher inert content in the gas recirculating in said second system than in the first mentioned system.

15. A process for the synthetic production of ammonia which comprises introducing nitrogen-hydrogen gas containing inerts into a primary cyclic gas system where it is recirculated under elevated pressure into contact with a catalyst for the synthesis of ammonia from the gas, bleeding from said system a portion of the gas recirculating therein at a rate in excess of normal, introducing the bled gas into a secondary cyclic gas system where it is recirculated under substantially the same elevated pressure as in the aforesaid gas system into contact with a catalyst for the synthesis of ammonia from the bled gas, and bleeding from the second gas system a portion of the gas recirculated therein.

16. A process for the synthetic production of compounds which comprises reacting a mixture containing inert material in the presence of a catalyst of relatively low catalytic activity in a primary cyclic system, withdrawing a portion of the reaction mixture circulating in the primary system from said system and introducing said withdrawn reaction mixture into a secondary cyclic system and therein reacting it in the presence of a catalyst of relatively higher catalytic activity.

17. A process for the synthetic production of ammonia which comprises reacting a mixture of hydrogen and nitrogen containing inert material in the presence of a catalyst of relatively low catalytic activity at an elevated temperature and pressure in a primary cyclic system, withdrawing a portion of the reaction mixture circulating in the primary system from said system and introducing said withdrawn reaction mixture into a secondary cyclic system and therein reacting it in the presence of a catalyst of relatively higher catalytic activity.

18. A process for the synthetic production of ammonia which comprises reacting a mixture of hydrogen and nitrogen containing inert material in the presence of a catalyst of relatively low catalytic activity at an elevated temperature and pressure in a primary cyclic system, withdrawing a portion of the reaction mixture circulating in the primary system from said system, introducing said withdrawn reaction mixture into a secondary cyclic system and therein reacting it in the presence of a catalyst of relatively higher catalytic activity, and during the aforesaid steps maintaining a materially higher inert content in the gas recirculating in said secondary system than in the primary system.

FRANK PORTER.

CERTIFICATE OF CORRECTION.

Patent No. 1,931,678.   October 24, 1933.

FRANK PORTER.

It is hereby certified that error appears in the printed specification of the above numbered patent requiring correction as follows: Page 3, line 130, claim 1, and page 4, line 23, claim 5, respectively, after "system" insert the words "from said system; and that the said Letters Patent should be read with these corrections therein that the same may conform to the record of the case in the Patent Office.

Signed and sealed this 5th day of December, A. D. 1933.

F. M. Hopkins
Acting Commissioner of Patents.

(Seal)